8612X
L. Kidder,
Constructing Cisterns,
Patented Jan. 21, 1835.
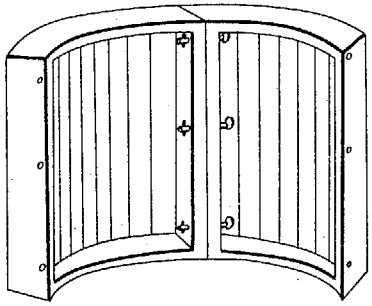
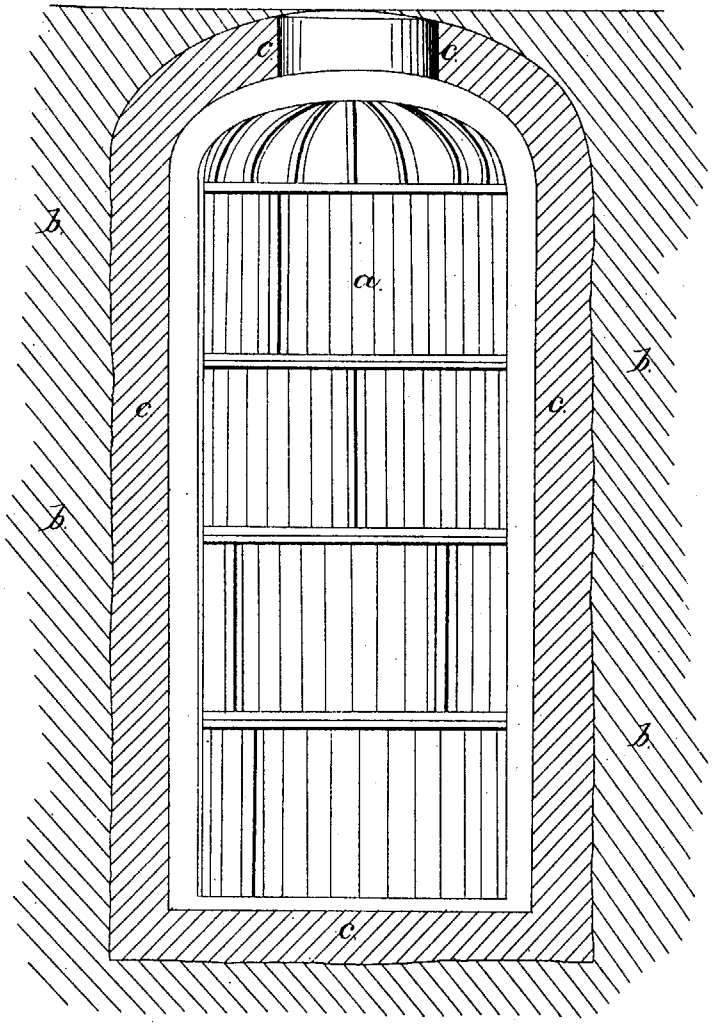
N. PETERS, PHOTO-LITHOGRAPHER, WASHINGTON, D. C.

8612X Jan 31. 1835

Levi Kidder

Letters Patent

The Schedule referred to in these Letters Patent and making part of the same containing a description in the words of the said Levi Kidder himself of his improvement in the construction of Cisterns or vessels formed in the earth for containing water and other fluids The Specification of Levi Kidder's improvement in the construction of vessels formed in the earth for containing water and other fluids in the words of the said Kidder. This applicant describes in the first place his improved mode of constructing such vessels & that others skilled in this art may construct the same.

Having excavated in the earth a space somewhat larger say two feet in every way than the horizontal dimensions of the vessel to be constructed and made the bottom or floor thereof horizontal and smooth. The operator must place or put together or construct the mould on said bottom as herein after described. The mould being constructed in the form externally which the cistern is to have internally. The operator by sifting puddling and pounding the earth packs it between the mould and the natural earth as compactly & firmly as it may be done: adding as the different kinds of earth used may require more or less clay or lime at discretion, and this packing of the earth around the exterior of the mould is continued till the whole of the desired shape is obtained: and then it is suffered to stand sufficient time to become hard and firm enough to preserve its form after the mould shall be removed. The mould may be constructed in the instance of a cistern, in a jar like form as follows. Let the mould be formed in pieces such as would be made of a jar taking for example a wooden jar were cut in sections parallel to its bottom and then those sections cut at right angles. It is manifest that a mould formed of pieces thus when laid up together on the floor of the cistern in the shape designed can be easily secured together while the earth is packing about it, and be easi ly

[illegible]

removed after the earth as become sufficiently solid by taking the pieces
apart and raising them up through the mouth of the jar form cistern.
Then having done this operator will then plaster the hydraulic, or water
cement upon the surface of the earth so shaped in the cistern and on
the floor or bottom thereof, putting on as many coats of cement, as
may be deemed expedient at discretion. Moulds of various shapes may
be framed with or without tops, but in all cases where the top or
cover of the cistern or vessel is to be formed of earth and cement
as above the mould must be shaped more or less in the shape
of a sphere or ellipsoid so as to bear its own weight, and that of
the superincumbent earth. But where the shape does not require
this, the mould may be made in pieces in any convenient manner
for the cover in such case when cover is wanted will be made of wood
or other material at convenience.
This applicant next describes the principle of his invention as
follows. The principle of this Invention consists in the mode
of forming the vessel intended, with earth substantially as aforesaid
by means of a removable mould. and by plastering Hydraulic or
water cement upon the earth thus shaped, covering the sides or
walls and also the bottom and top or cover of said vessel, if the
top be formed as aforesaid with one or more coats of said cement
so as to make said vessel sufficiently tight to hold water or other
fluids or liquors which can be held by cement.
This applicant does not claim as his invention the mere plas
tering of cement upon the earth or earthly walls. This he con
siders is a use of cement which belongs to the public, of common
right. neither does he claim the mere application of hydraulic or
water cement or any other cement to the constructing in any man
ner of all or any part of vessels of any kind designed to contain flu
ids of any sort. nor does he claim the mere use of gravel to stif
fen or harden the mortar but considers this application of such
cement and the use of gravel or earth in the construction of such
vessels as a matter of common right. as much as water. But the

8612X claim of this applicant in respect to the construction of such vessels,
mainly as aforesaid in the mode or method above described of
forming vessels intended to be constructed to hold water or other flu-
ids aforesaid. — And this applicant further describes the
various modes or purposes for which he contemplates the applicatio[n]
of his said invention viz. In the construction of cisterns [illegible]
reservoirs, baths, and other vessels, for containing water or other flu-
ids and liquors, and those vessels to be constructed with walls or
sides in any form, and with or without tops or covers.

And in respect to the moulds to be used these may be constru-
cted in parts so as to be conveniently removable and preserved for
future use, or moulds may be constructed specially for a partic-
ular structure, and be broken to pieces to be removed so as to be
unfit for future use. But the former is the better and preferr[ed]
mode of constructing the moulds. So also where the top of a
vessel is formed of earth, the part or parts of the mould which
sustains the top may be sustained by upright posts resting on
the bottom. after this be plastered and the walls also nearly up
to the top — be covered with cement, and thereby the vessel or cis-
tern may be fit for use without waiting for the consolidation and
hardening of the earthy top, which will be the more likely to en-
dure if supported by the mould a long time, or till it be nearly
dry. Then these parts of the mould supporting the top being re-
moved, the top should be plastered with cement forthwith.
The better and preferred mode however is to plaster the whole inside
at the same time as aforesaid, thus making a better finish of
the cement, as is obvious to workmen in the trade. Witness
my hand this 6th January 1835

Levi Nedder

Witnesses
Abm. Sturing Jr
M. O. F. Gaines (1104 Words)

(Granted January 27. 1835)